May 19, 1959 K. SASS 2,887,537
ARRANGEMENT FOR ASSESSING CHARGES IN TELEPHONIC P.B.X. SYSTEMS
Filed April 14, 1954
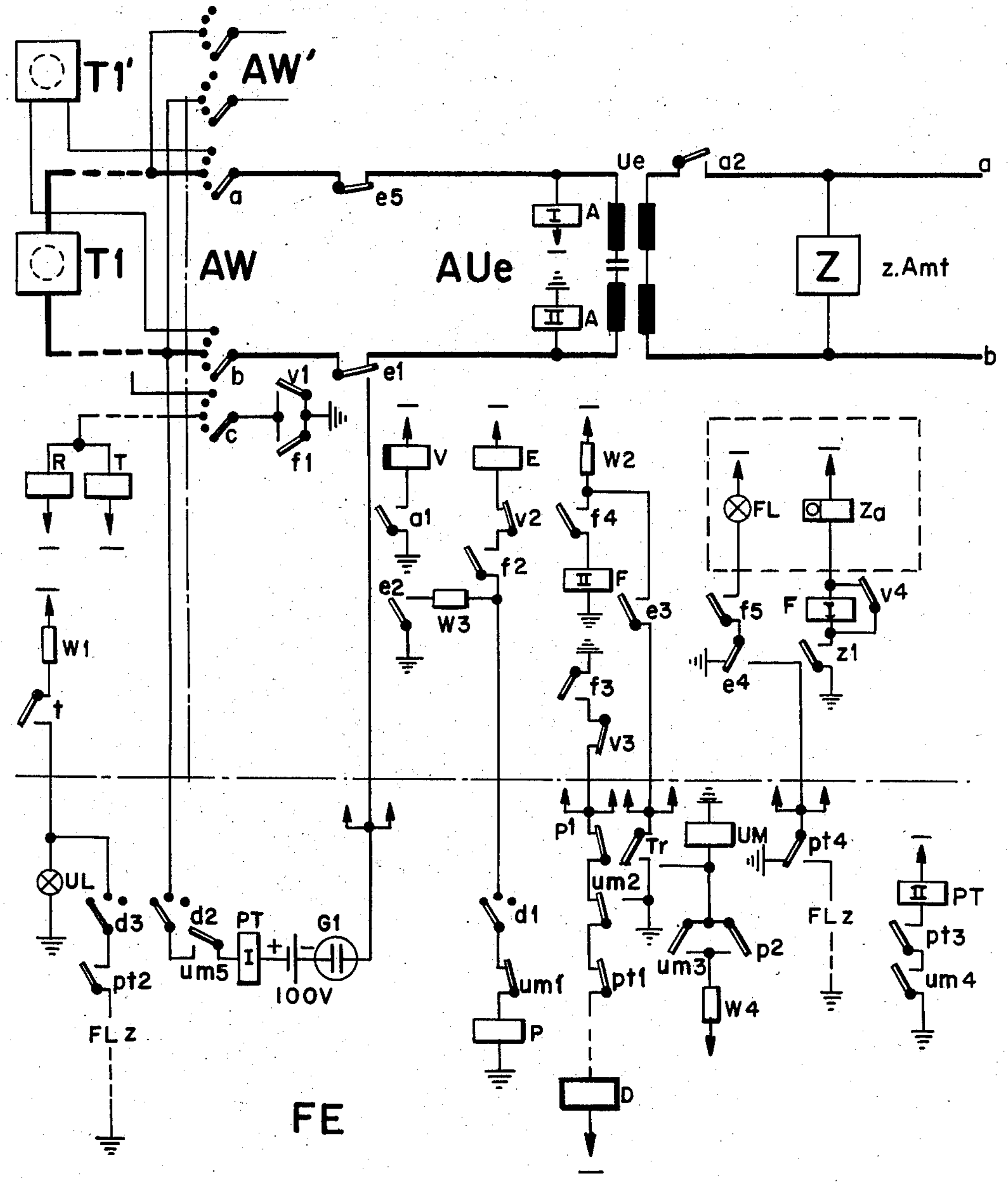
INVENTOR
KARL SASS
BY Robert Harding Jr.
ATTORNEY

United States Patent Office 2,887,537

Patented May 19, 1959

2,887,537

ARRANGEMENT FOR ASSESSING CHARGES IN TELEPHONIC P.B.X SYSTEMS

Karl Sass, Stuttgart-Stammheim, Germany, assignor to International Standard Electric Corporation, New York, N.Y., a corporation of Delaware Application April 14, 1954, Serial No. 423,079

Claims priority, application Germany April 29, 1953

5 Claims. (Cl. 179—7.1)

Arrangements are known for assessing the charge for any connection, such as a trunk connection, established by a P.B.X set over an office line. According to one such arrangement, equipments allocated at the P.B.X operator's position, each to one office line, and comprising a counter, a signal lamp, and subscriber-identification means, are employed to assess the charges in such a manner that the signal lamp indicates to the operator the beginning and the end of the call, and the operator may then ascertain what the counter indicates in respect of these two call stages, while with the aid of the identification means, the operator also may ascertain the identity of the caller's set and thereupon proceeds to release the connecting devices still engaged.

This arrangement requires the operator to manipulate two keys as soon as she is informed by a lamp that the conversation has been finished. One of these keys serves to identify the caller, the other, being a cancel key, serves to restore the identification switching-means to normal. Thus, for any office call terminated, the operator has to perform two operations. By means of the present invention, the assessing manipulations incumbent on the operator are simplified. To this end the switching means for the subscriber-identification are allocated to several office lines and, on termination of the call, act in conjunction with switching means of the office line to mark the office line over which the conversation has been conducted and to ascertain, with the aid of the connecting-set still engaged, the subscriber's line by which the office call has been initiated.

According to a further development of the invention one selector is provided as a switching means arranged to accomplish both ascertainments. A wiper of this selector serves to connect the supervisory lamps, allocated to the subscriber's lines, with a flashing device. When the selector has tested on the connecting-set still engaged, the supervisory lamp for the respective subscriber's line is thereby caused to flash, whereby the caller is identified.

After the particulars requisite to enable the charge assessment have been transferred, the P.B.X operator proceeds to manipulate a cancel key and thereby causes the identification device to become restored to normal, this device being common to all the office lines.

Such an arrangement thus has the advantage that the identification of the caller and of the office line engaged is accomplished full-automatically, so that only one manipulation has to be effected by the P.B.X operator, namely, the manipulation by which the identification device is restored to normal.

The invention will be more fully understood from the following description that relates to one embodiment thereof represented in the accompanying drawing. For clearness any details not concerning the invention proper are not shown.

Assume that party T1, aiming to establish an office connection, has engaged the office repeater AU*e* over office selector AW. Relay A operates and by means of its contact *a*1 operates relay V. The operation of relay V operates relays T and R in the line circuit of T1 over contact *v*1 and wiper *c* of the office selector AW. The operation of relay T operates a lamp UL, individual to the line T1, in the circuit +, UL, *t*, W1, —

The selectors within the office are then set by the customary pulsing, which operates the contact *a*2 of relay A in accordance with the digit dialled. Connected as a bridge across the wires *a*, *b*, that lead to the office, is a device Z which serves to receive time counting pulses arriving from the office. In the embodiment here described the time counting pulses are constituted by an alternating current of 16 kc./s. Be it also assumed that the first counting pulse will be transferred over the speech wires *a*, *b* as soon as the remote party answers. Device Z consequently responds to each timing pulse and causes contact *z*1 thereof to follow the pulses, thus causing the counter Z*a* to count the pulses. In the circuit of Z*a* the relay F energizes also, because relay V has opened its contact *v*4 by which coil 1 of relay F has been short-circuited. In this way the circuit +, *z*1, F(I), Z*a*, — has been closed. Over coil II and contact *f*4 of F this relay holds itself independently of contact *z*1. Over contact *f*5 of F the supervisory lamp FL is inserted:

+, *e*4, *f*5, FL, —

This lamp is characteristic of the office line over which a toll call is being conducted.

During this conversation the counter Z*a* steps on in the rhythm of the counting pulses and thus determines the charge. As soon as on termination of the call the party T1 restores the handset, contact *a*2 of A reopens, whereby the line to the office will again be free. Since, however, the conversation has been a toll call, relay F remains excited, locked over its winding II and its +4 contact. Therefore the test wire leading to the party circuit remains engaged over contact *f*1 of F, so that the selector AW will not be released. Contact *a*1 of A reopens and thus causes relay V to fall off after a delay. Contact *v*3 of V hence closes the circuit of the magnet D of the rotary selector switch in the identification circuit FE. This magnet then causes the switch to step on until test wiper *d*1 completes the circuit in which the contacts *v*2, *f*2 have closed and which is characteristic of the office repeater engaged:

+, P, *um*1, *d*1, *f*2, *v*2, *v*2, E, —

In this circuit the relay P in the identification circuit FE and the relay E in the office line circuit respond. Relay E remains excited over its contact *e*2. Contacts *e*5 and *e*1 disconnect the office repeater AU*e* from the office selector AW. At the same time the make contact of *e*1 connects the *b* wiper of the selector AW to a test circuit to be referred to later. Contact *e*4 transfers the operating circuit of the signal lamp FL to the identification circuit FE. The operation of relay E has marked the office line over which a toll call was conducted in the first test operation of the rotary selector D of the identification device FE common to all the office lines.

Contract *p*1 of P breaks the circuit of magnet D and thus temporarily stops the selector. Contact *p*2 of P causes energization of relay UM:

+, UM, *p*2, W4, —

Relay UM holds itself over its contact *um*3. At contact *um*1, relay UM opens the circuit for relay P which releases, while contact *um*4 prepares a circuit for winding II of relay PT and contact *um*5 prepares the test circuit, referred to above, including the *b* wiper of the selector AW.

On energization of relay UM the rotary selector again steps on, this time in the circuit +, *um*2, *pt*1, D, −

Since the office selector AW is still set to station T1, the test circuit mentioned above is closed over contact *e*1 of the respective office repeater and over wiper *d*2 of the rotary selector:

+(100 v.), PT(I), *um*5, *d*2, wiper *b*, *e*1, G1, −

Relay PT responds as soon as wiper *d*2 joins the respective test circuit connected through. This relay remains energized over its contact *pt*3 and contact *um*4 of UM, and over its coil II. At contact *pt*1, relay PT opens the circuit of the magnet D and stops the rotary selector switch. Over wiper *d*3 of the rotary selector the contact *pt*2 of PT closes another circuit of the supervisory lamp UL allocated to the respective party, which circuit is in the identification circuit FE and contains a flashing device FL*z* that causes the lamp UL to flicker in a certain rhythm and thereby to indicate to the P.B.X operator that the conversation has been finished. A second flashing device FL*z'* is included in the circuit of lamp FL by the closing of make contact *pt*4, this circuit containing the contacts *f*5 of F, *e*4 of E, and *pt*4 of PT. Both lamps thus begin to flash after the conversation has been finished. They induce the operator to read the counter and to write down the charge to be assessed on the party.

After the operator has written down the charge, she has to depress the key T*r*, whereby relay F of the office repeater AU*e*, and relay UM of the identification device FE are caused to fall off by their coils becoming shorted. Contact *f*1 opens and thus frees the subscriber's line by releasing relays R and T. Contact *f*2 breaks the holding circuit for relay E which releases. Contact *f*5 disconnects and extinguishes the lamp FL. Relay PT and lamp UL of the identification circuit FE likewise return to normal by the release of relay UM, whereupon selector D of the identification device, this selector being common to all the office lines, can be restarted. The counting device Z*a* may also be restored to normal by the operation of this key T*r* in a manner not shown.

What is claimed is:

1. Apparatus for assessing the charge for a connection established between two lines comprising a plurality of lines, connecting means comprising a plurality of office line circuits for establishing a connection between a calling and a called line over one of said circuits, an operator's position, time counting means at said operator's position responsive to time counting pulses received over an office line circuit when the call has been established over said circuit for indicating the time duration of the call, switching means at said operator's position, means responsive to a termination signal on the office line handling said call, control means operated by said responsive means for causing said switching means to indicate the office line circuit handling the call, whereby the operator is advised that the time counting means associated with that particular office line may be read, and means operated by said control means for causing said switching means to indicate which of said lines has made the call, whereby the operator may charge the time of the call against the account of said line.

2. Apparatus, as claimed in claim 1, in which the switching means is a single selector switch arranged to indicate the office line handling the call and the calling line in successive operations.

3. Apparatus, as claimed in claim 2, in which the means for causing the switching means to indicate which of the lines has made the call comprises a supervisory lamp for each line, a flashing device, and means for causing a wiper of the selector switch to connect the lamp associated with a calling line to said flashing device.

4. Apparatus, as claimed in claim 1, in which the switching means is a single selector switch and the means for causing the switching means to indicate which of the calling lines has made the call comprises a test circuit including a terminal of said selector switch connected to the calling line and further including a portion of the connecting means for establishing the connection between the lines, means for stopping said selector switch when said test circuit is completed, indicator means for each line, and means for operating the indicator means for the calling line when said selector switch has stopped on said terminal.

5. Apparatus for assessing the charge for a connection established by a private branch exchange set over an office line comprising an operator's position, a plurality of subscribers' lines, a plurality of office lines, selector means responsive to the initiation of a call on a subscriber's line for seizing an office line and connecting said calling line thereto, first repeating means connected to said seized office line for repeating dialled pulses over said office line, second repeating means connected to said seized office line responsive to time counting pulses received over said office line, time counting means for each office line responsive to the operation of said second repeating means for registering the time duration of a call, a signal lamp for each office line, means operated by said second repeating means for lighting said lamp, a signal lamp for each subscriber's line, means for operating said subscriber's line signal lamp when said office line is seized by said selector means, a selector switch common to all said office lines having banks of terminals and wipers therefor, a first of said terminal banks having its terminals connected respectively to said office lines and a second of said terminal banks having its terminals connected respectively to said subscribers' lines, means responsive to a termination signal received from said calling line for causing said selector switch to step, means for arresting the operation of said stepping means and for causing the office line signal lamp connected to the office line which carried the call to flash when the associated wiper of said selector switch reaches the terminal connected to said office line, whereby the attention of the operator is drawn to the fact that the time counting means may be read, means operated by said last mentioned means for again operating said stepping means, means for arresting the operation of said stepping means and for causing the calling line signal lamp to flash when the wiper of said selector switch associated with said second terminal bank reaches the terminal connected to said calling line, whereby the operator may identify said calling line.

References Cited in the file of this patent

UNITED STATES PATENTS

| | | |
|---|---|---|
| 1,712,488 | Boynton | May 14, 1929 |
| 1,840,359 | Hellner | June 12, 1932 |
| 2,277,802 | Thies et al. | Mar. 31, 1942 |
| 2,400,085 | Gent | May 14, 1946 |
| 2,581,900 | Baker | Jan. 8, 1952 |
| 2,721,898 | Lomax | Oct. 25, 1955 |